(12) United States Patent
Rennie (10) Patent No.: US 8,152,429 B2
(45) Date of Patent: Apr. 10, 2012

(54) HAY BALE COLLECTION AND STACKING SYSTEM

(76) Inventor: John Lionel Rennie, Lumby (CA)

( * ) Notice: Subject to any disclaimer, the term of this patent is extended or adjusted under 35 U.S.C. 154(b) by 220 days.

(21) Appl. No.: 12/192,331

(22) Filed: Aug. 15, 2008

(65) Prior Publication Data

US 2010/0040435 A1    Feb. 18, 2010

(51) Int. Cl.
*A01D 90/00* (2006.01)
*A01D 90/08* (2006.01)

(52) U.S. Cl. ............ 414/111; 414/552; 414/555

(58) Field of Classification Search .......... 414/111, 414/132, 24.5–24.6, 408, 493, 541, 544, 414/546, 549, 553, 555, 633, 789.3, 789.7 414/911
See application file for complete search history.

(56) References Cited

U.S. PATENT DOCUMENTS

| | | | | |
|---|---|---|---|---|
| 1,998,434 A | * | 4/1935 | Bach | 414/715 |
| 3,074,570 A | * | 1/1963 | Venziani | 414/541 |
| 3,174,636 A | * | 3/1965 | Dempster et al. | 414/409 |
| 3,861,547 A | * | 1/1975 | Sink, Sr. | 414/648 |
| 4,057,156 A | * | 11/1977 | Thompson et al. | 414/408 |
| 4,076,138 A | * | 2/1978 | Honomichl, Sr. | 414/24.5 |
| 4,329,102 A | | 5/1982 | Gray | |
| 4,459,075 A | | 7/1984 | Eichenberger | |
| 4,710,087 A | * | 12/1987 | Naaktgeboren et al. | 414/789.7 |
| 4,872,801 A | * | 10/1989 | Yeazel et al. | 414/409 |
| 5,062,757 A | | 11/1991 | Eichenauer | |
| 5,333,981 A | | 8/1994 | Pronovost et al. | |
| 5,582,501 A | * | 12/1996 | Meyer | 414/491 |
| 5,618,146 A | * | 4/1997 | Cooper | 414/24.5 |
| 5,639,198 A | * | 6/1997 | Pearce | 414/24.5 |
| 5,813,814 A | * | 9/1998 | Smart | 414/111 |
| 6,312,205 B1 | | 11/2001 | Vandenberg | |
| 6,478,522 B2 | | 11/2002 | Babb | |
| 6,935,827 B2 | | 8/2005 | Delaurier | |
| 7,004,706 B1 | | 2/2006 | Wilson | |
| 7,090,456 B2 | | 8/2006 | Ost et al. | |
| 7,210,888 B2 | | 5/2007 | Bearden | |
| 7,241,098 B1 | | 7/2007 | Wilson | |
| 7,252,190 B2 | | 8/2007 | Priepke | |
| 2003/0031533 A1 | | 2/2003 | Declaurier | |
| 2006/0004657 A1 | | 1/2006 | Menke | |

* cited by examiner

*Primary Examiner* — Gregory Adams
(74) *Attorney, Agent, or Firm* — McGlew and Tuttle, P.C.

(57) ABSTRACT

The present invention relates to an improved system for collecting and stacking round hay bales on a flat bed trailer, particularly for use in agricultural applications such as farming or the like.

18 Claims, 9 Drawing Sheets

HAY BALE COLLECTION AND STACKING SYSTEM

FIELD OF THE INVENTION

The present invention relates to an improved system for collecting and stacking round hay bales on a flat bed trailer, particularly for use in agricultural applications such as farming or the like.

BACKGROUND OF THE INVENTION

It is common practice to transport hay and other agricultural products from one location to another as needed. Hay is usually baled into large cylindrical bales secured with twine that will often weigh several hundred kilograms depending on its size and moisture content. It is well known that moving these bales with purely manual labor is very difficult and as a result a mechanical apparatus to retrieve, transport and unload these most hay bales is required.

In the past, the collection and stacking of hay bales is typically achieved with the use of various lifting and transporting equipment and the simultaneous work of at least two operators. For example, when collecting round hay bales in a field, one operator may drive a tractor with an attached flat bed trailer and a second operator will follow with a forklift or other appropriate lifting equipment. The first tractor moves the flatbed trailer close to one or more hay bale(s), pausing to let the forklift or other appropriate lifting equipment stack the hay bale(s) on the flatbed trailer. This method for the collection and stacking of hay bales is undesirable as it requires the labor of two operators and requires two pieces farm equipment.

Alternatively, farmers may choose to collect and stack hay bales with a single towing system. In this case, the farmer will typically tow a flat bed trailer with a tractor having a front-end forklift or other appropriate lifting device. This method requires the operator to sequentially stop at select areas in the fields, manually disconnect the trailer, use the forklift to load and stack nearby bale(s) onto the flat bed trailer and then reconnect the flat bed trailer before continuing to the next area where a number of bales may be located. While this collection method can eliminate a second operator, this method is undesirable as it is time consuming and laborious for one person to complete.

Furthermore, once all hay bales have been collected and transported to a desired unloading or storage area, the process of offloading any hay bales from a flat bed trailer requires a forklift or other appropriate lifting equipment and like the loading processes described above is time-consuming.

Further still, forklifts or other lifting equipment will often cause damage to hay bales. For example, a forklift may pierce the hay bale or sever any attachments holding the bale together such that additional work may be required to repair or remove damaged bales.

Moreover, farmers may cover hay bales in a wrapping material when producing haylage, silage or the like. For the fermentation of silage, haylage or the like to be effective, the wrapping must remain intact. Often forklifts and other appropriate lifting equipment handles bales roughly resulting in tears, punctures or the like that inhibit the formation of silage, haylage or the like.

As a result, there has been a need for hay bale collection equipment allowing a single operator to efficiently move around a field collecting multiple hay bales without getting out of their tractor and that provides a reliable but simple system that minimizes the risk of damage to a hay bale.

A review of the prior art indicates that while various systems for collecting and transporting hay bales have been provided in the past, there continues to be a need for new designs of such systems that provide improvements over these past systems. For example, the prior art shows various hay bale collection and lifting systems including U.S. Pat. No. 4,459,075, U.S. Pat. No. 6,935,827, US Patent Application 2003/0031533, U.S. Pat. No. 6,478,522, U.S. Pat. No. 7,004,706, U.S. Pat. No. 5,333,981, U.S. Pat. No. 4,329,102, U.S. Pat. No. 4,076,138, U.S. Pat. No. 5,062,757, U.S. Pat. No. 7,252,190, US Patent Application 2006/004657, U.S. Pat. No. 7,241,098, U.S. Pat. No. 6,312,205, U.S. Pat. No. 7,090,456, and U.S. Pat. No. 7,210,888.

SUMMARY OF THE INVENTION

Accordingly, it is the object of the present invention to provide a hay bale collection and stacking system requiring only one operator who does not have to exit their tractor.

It is another object of the present invention to provide a hay bale stacking and collection system that can load multiple stacks of hay bales onto one flatbed trailer.

It is still a further object of the present invention to provide a hay bale stacking and collection system that can offload all hay bales in an efficient manner.

It is yet another object of the present invention to provide a hay bale stacking system that is simple, reliable and robust in order to prevent malfunction.

In accordance with the invention, in a first embodiment a hay bale stacking system for operative attachment to a trailer for lifting and stacking hay bales on the trailer is provided, the hay bale stacking system comprising:
  a main pivot arm having a first end and a second end, the first end pivotally connected to a first side of the trailer, the main pivot arm including a main track and a guide track;
  a cradle having a track pivot wheel operably mounted within the main track and a cradle pivot wheel operatively mounted on the guide track, the cradle for operable support and lifting of a hay bale from the ground to the trailer;
  a hydraulic system for moving the cradle along the main track, for rotating the cradle with respect to the main pivot arm and for lifting the main pivot arm;
  wherein the main pivot arm, cradle and hydraulic system are operable between a ground position and first and second positions where two hay bales are unloaded to first and second locations beside each other on the trailer and a third position where a third hay bale is unloaded on top of two hay bales in the first and second locations.

In further embodiments, the guide track includes a ramp for rotating the cradle for unloading a hay bale from the first position, the main track includes a one-way stop for preventing inboard movement of the main track wheel within the main track when unloading a hay bale from the second position and/or the main pivot arm includes a latch for locking the main pivot arm in a lower position when unloading a hay bale from the first and second positions.

In a further embodiment, the latch is operable to an unlocked position enabling the main pivot arm to upwardly pivot for unloading a hay bale from the third position.

In one embodiment, the hydraulic system includes a main hydraulic cylinder and piston and an auxiliary hydraulic cylinder and piston for supporting the main hydraulic cylinder and piston.

In another embodiment, the cradle includes a cradle extension system for adjusting the size of the cradle.

In yet another embodiment, the system includes a first treadle operatively connected to the trailer, the first treadle including an operative connection between the first treadle and one-way stop wherein actuation of the first treadle activates the one-way stop. In another embodiment, the system includes a second treadle operatively connected to the trailer, the second treadle including an operative connection between the second treadle and latch wherein actuation of the second treadle disengages the latch.

Further still, the system may include a conveyor belt system for operative connection to the trailer for moving tiers of hay bales rearwardly on the trailer.

BRIEF DESCRIPTION OF THE FIGURES

The invention is described with reference to the accompanying figures in which.

DETAILED DESCRIPTION

System Overview

In accordance with the invention and with reference to the figures a hay bale collection and stacking system 10 is mounted on a flat bed trailer 30. The system generally includes cradle 12, pivot arm 14, main track 15, guide track 15a, latch 14b, one-way stop 26 and at least one hydraulic cylinder 18 mounted at the front end of the trailer 30. The trailer 30 includes wheels 34 and a trailer hitch 35 as known to those skilled in the art.

Figure 1:
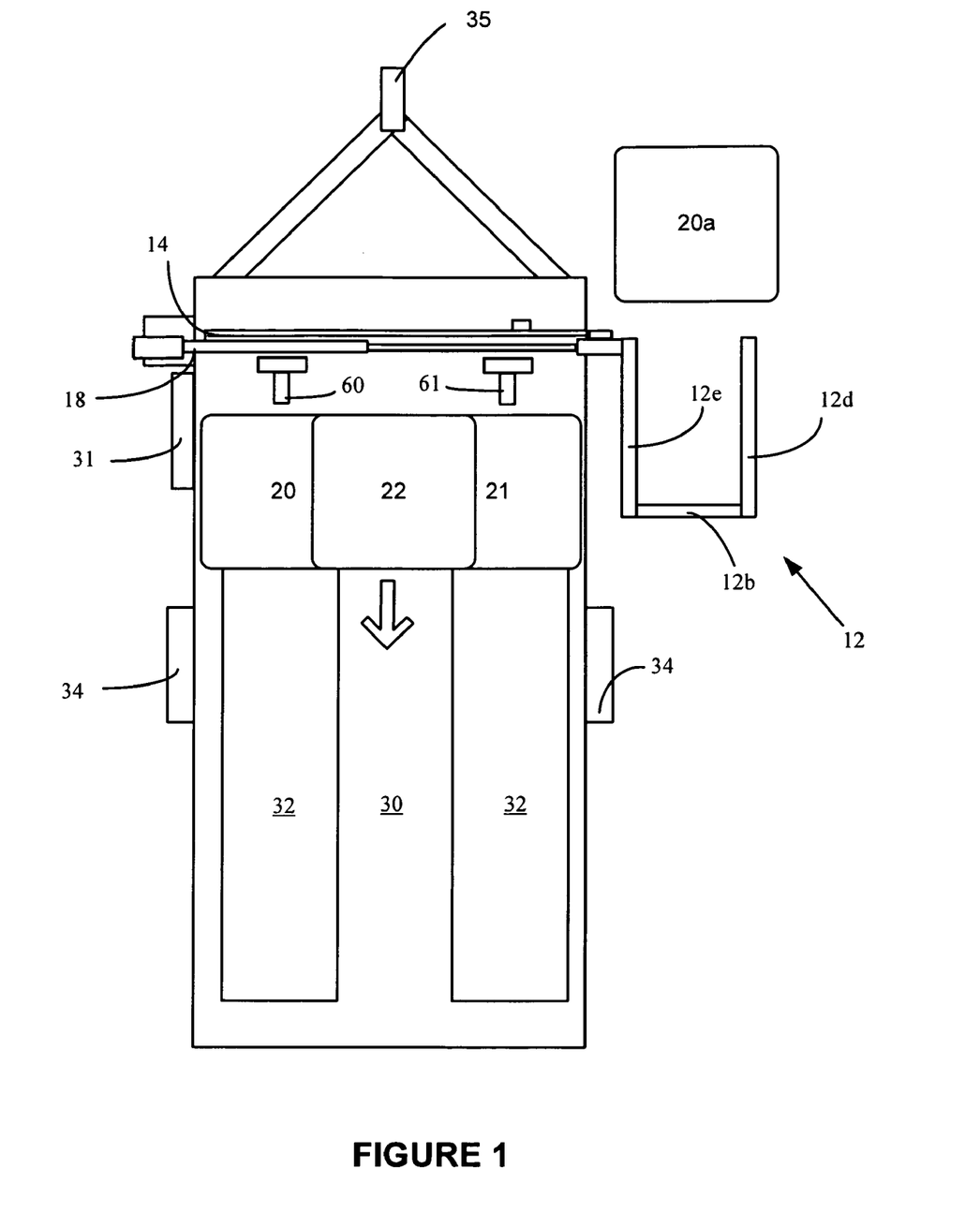
FIG. 1 is a schematic plan view of a hay bale stacking system and trailer in accordance with the invention.
Figure 2:
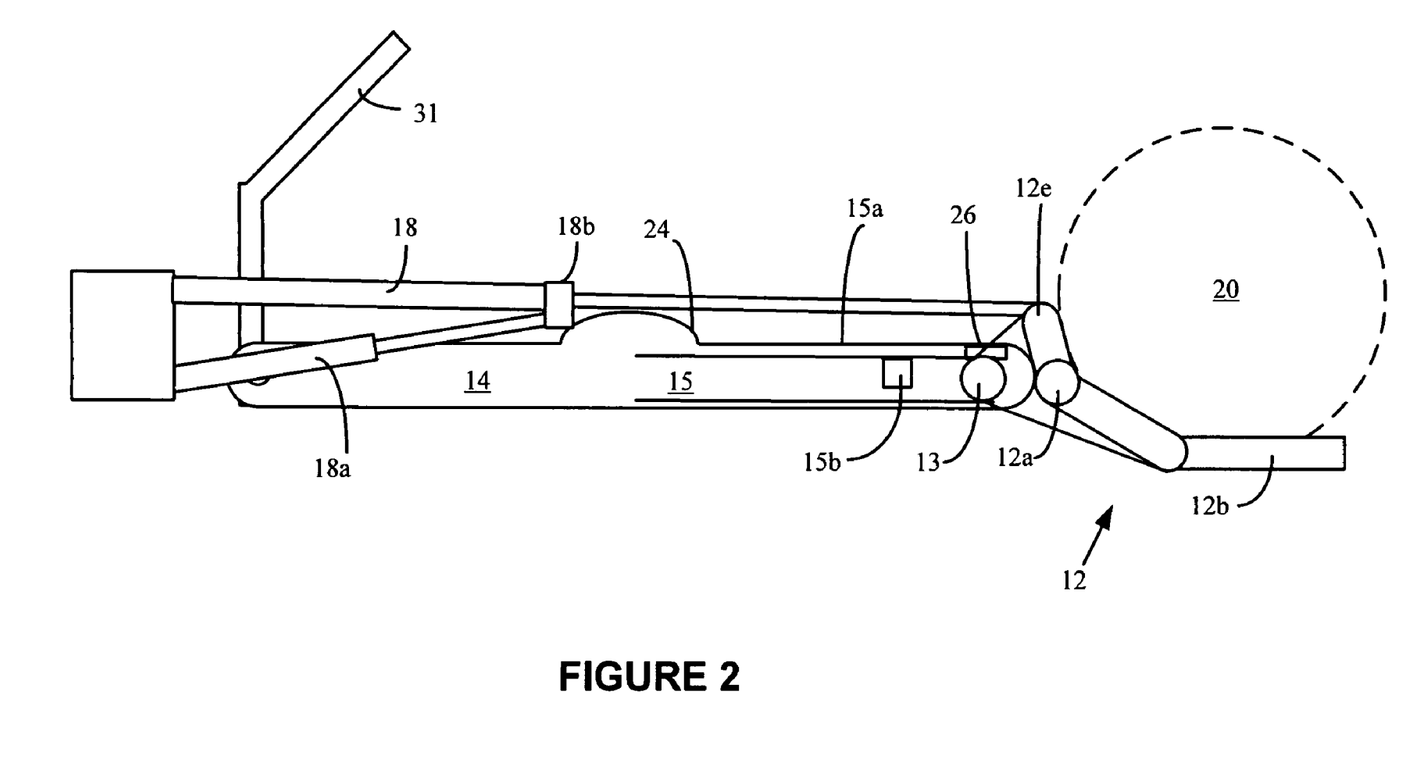
FIG. 2 is a schematic end view of the hay bale stacking system in accordance with the invention showing picking up a first bale in a series of three.

More specifically, and as shown schematically in FIGS. 1 and 2, the cradle 12 includes a track pivot wheel 13 able to slide and pivot within main track 15 and a cradle pivot wheel 12a able to roll along the guide track 15a that collectively enables both horizontal and vertical translation of the cradle from an outboard position as shown in FIG. 2 and various inboard positions as will be described in greater detail below and shown in FIGS. 3-11. As shown, a main hydraulic cylinder and piston 18 is operatively attached between the frame of the flat bed trailer 30 and the cradle 12 to cause cradle 12 motion along the main track 15 and guide track 15a. An auxiliary hydraulic cylinder and piston 18a is operatively connected between the frame of the flat bed trailer 30 and a support point 18b to assist in the support of the main hydraulic cylinder and piston 18 during operation of the system.

Additionally, the cradle 12 will preferably include a cradle hydraulic cylinder 18d (shown in FIG. 12) to effect lateral extension and retraction of the cradle extension arm 12b and thereby enable opening and closing of cradle arms 12c and 12d. The retraction of the cradle extension arm 12b allows for the adjustment of the cradle so as to accommodate hay bales of different sizes within the cradle and/or to enable adjustment of the cradle to help prevent damage to the hay bale and its wrapping material as will be explained in greater detail below.

Generally, during operation of the system, round hay bales 20a are picked up from the ground and stacked on the trailer in sets or tiers of three bales with the first and second hay bales 20, 21 forming a base and a third hay bale 22 being placed on top of the first and second hay bales. As shown in FIG. 1, as each set or tier is completed, a conveyor belt system 32 will move each set or tier to a rearward position on the trailer as denoted by the arrow.

Loading the First Hay Bale

Figure 12:
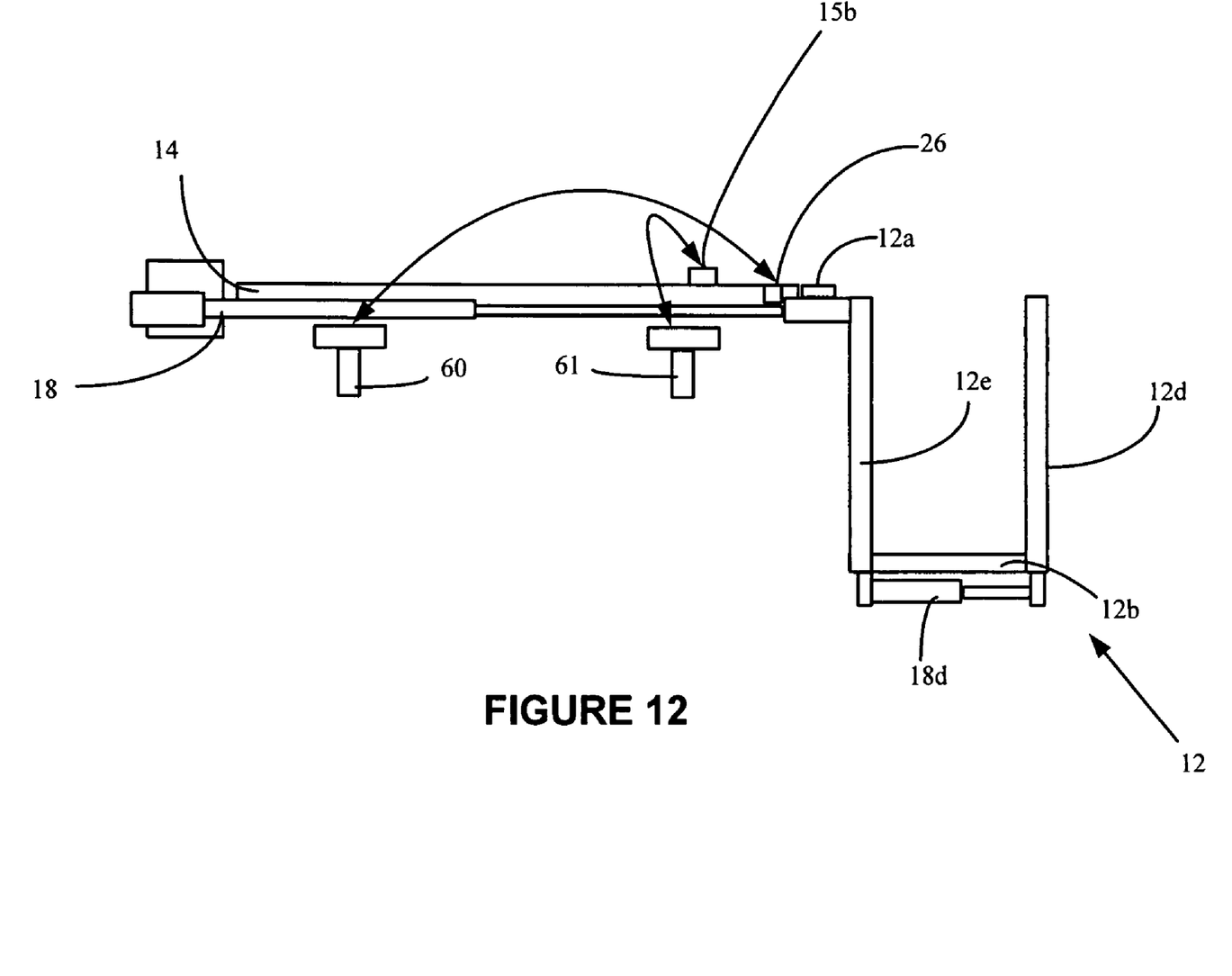
FIG. 12 is a schematic plan view of the hay bale stacking system showing linkage connections between a first treadle and stop and second treadle and latch in accordance with the invention.

Referring to FIGS. 2-5, to load the first hay bale 20, the cradle extension arm 12b is lowered to a loading position such that it extends laterally and generally horizontally from the flatbed trailer 30 slightly above ground level to allow the operator to move the trailer and lifting system towards individual hay bales in the field. As the operator approaches a first hay bale 20, the cradle 12 is opened sufficiently wide to receive the first hay bale 20 between the two forwardly extending cradle arms 12c, 12d of the cradle 12 by activation of hydraulic cylinder 12d (FIG. 12). Once the operator is satisfied that the cradle 12 and cradle arms are aligned with the first hay bale 20, the operator drives the tractor 28 forward until the first hay bale 20 is engaged by the cradle 12 from behind and is contained within the cradle arms. The cradle extension arm 12b may be adjusted laterally as necessary to ensure that the hay bale is properly positioned within the cradle arms.

When the first hay bale 20 is secure within the cradle 12, the main hydraulic cylinder 18 is activated causing a rotation of the cradle 12 (containing hay bale 20) towards the flatbed trailer 30 as cradle extension member 12e is drawn inwardly. Initially, inboard movement of the track pivot wheel 13 is prevented by the position of the cradle pivot wheel 12a at the outer edge of the pivot arm 14 such that actuation of the main hydraulic cylinder 18 will cause the cradle pivot wheel 12a to upwardly rise along the guide track 15a thereby causing an initial vertical translation and rotation of the cradle 12 so as to lift the hay bale 20 above the deck of the flatbed trailer 30. As the cradle pivot wheel slides along the guide track 15a to the horizontal position, track pivot wheel 13 will then begin to move inwardly along main track 15. Auxiliary hydraulic cylinder 18a may support the main hydraulic cylinder 18 at this time.

Figure 3:
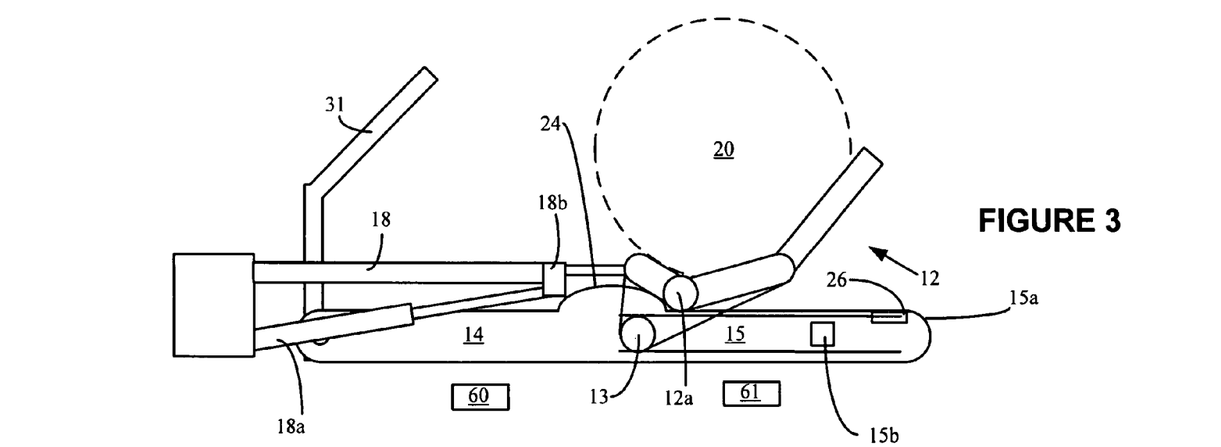
FIGS. 3, 4 and 5 are schematic end views of the hay bale stacking system in accordance with the invention showing the unloading of the first bale.
Figure 4:
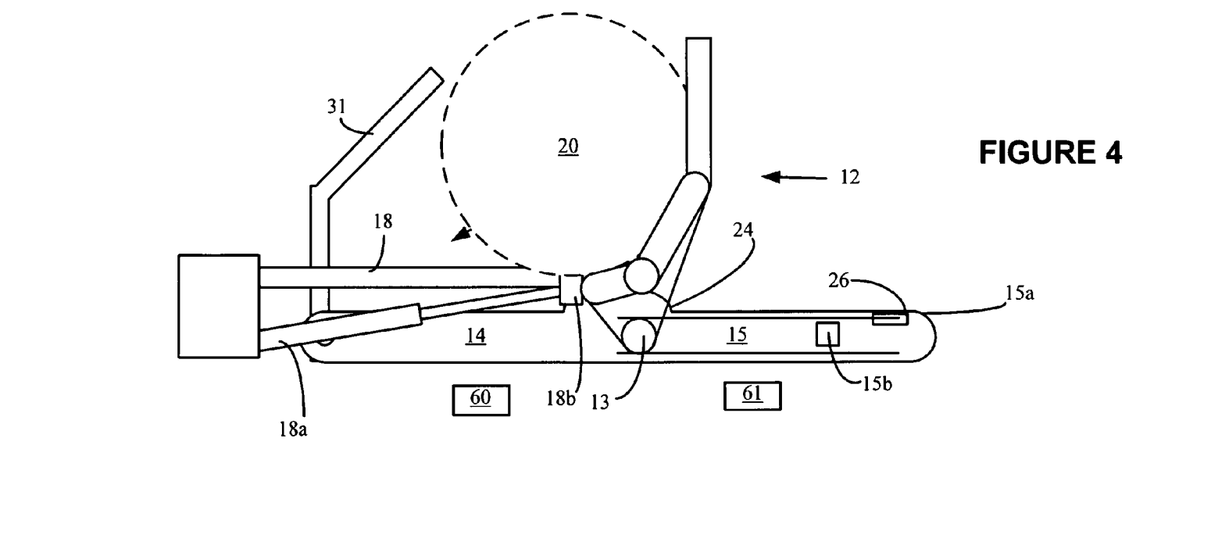
Figure 5:
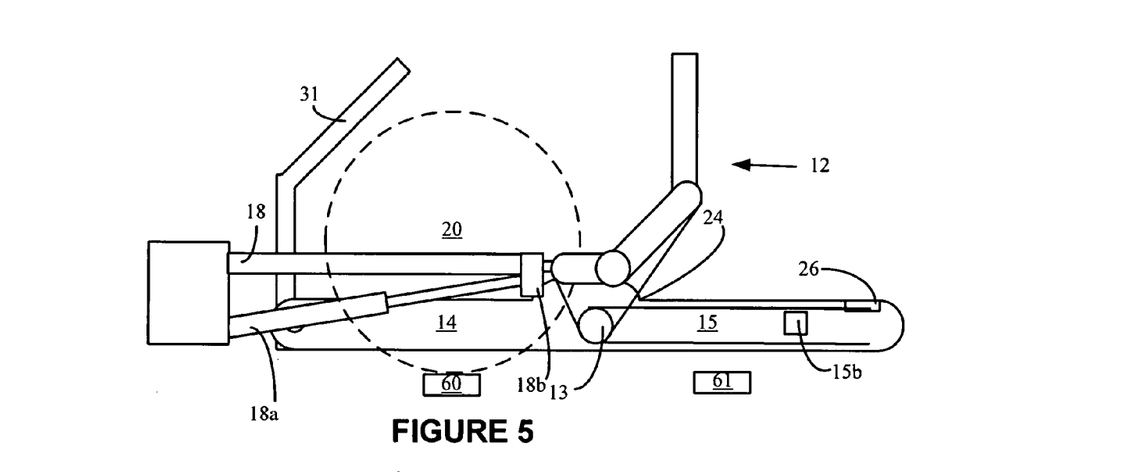

Now referring to FIG. 3, once the cradle pivot wheel 12a has been lifted to the upper surface of the main track 15, the cradle pivot wheel 12a and track pivot wheel 13 will then be horizontally translated along the guide track 15a and main track 15 respectively in the direction of ramp 24. When the ramp 24 is reached, the cradle pivot wheel 12a will engage with the ramp simultaneously causing further rotation of the cradle 12 about the cradle pivot wheel and upward movement of the cradle along the ramp 24. At the same time, track pivot wheel 13 will reach the end of main track 15. At the apex of the ramp, hay bale 20 is overcome by the force of gravity (FIG. 4) and rolls out the cradle 12. The first hay bale 20 comes to a stop on the flat bed trailer (FIG. 5). Railing 31 is provided to prevent the first hay bale 20 from rolling off the trailer. As shown in FIG. 5, hay bay 20 depresses first treadle 60 on the trailer which activates one-way stop 26 on the main track 15.

The cradle 12 is then returned to the initial loading position by extending the hydraulic cylinder 18 which causes the translation of the track pivot wheel 13 along main track 15 and cradle pivot wheel 12a along guide track 15a respectively until the original horizontal or loading position is reached. The system 10 is then able to load the second and third hay bales 21, 22.

Loading the Second Hay Bale

Figure 6:
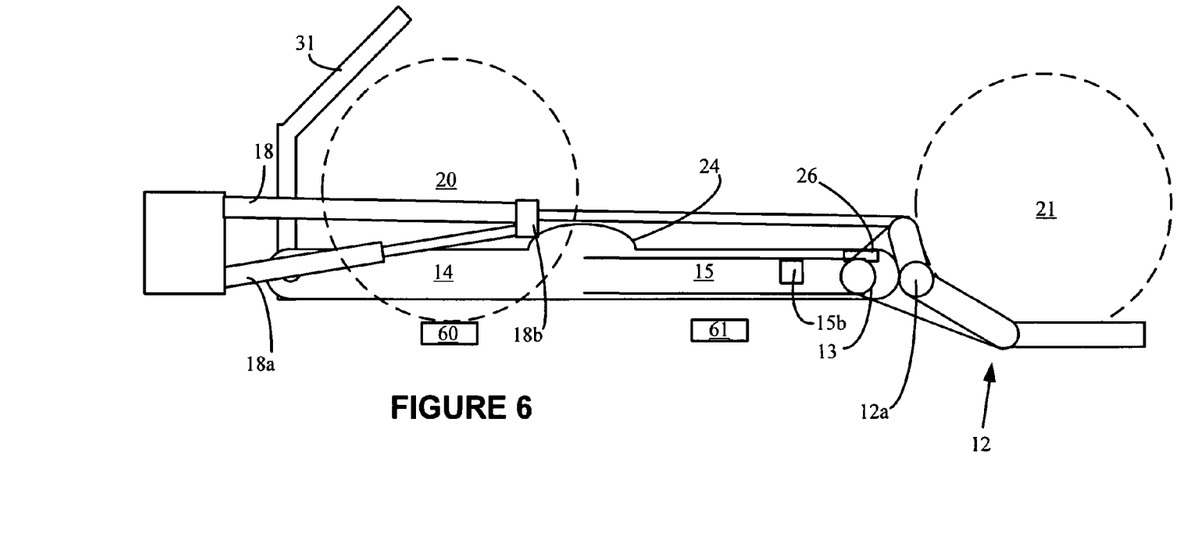
FIG. 6 is a schematic end view of the hay bale stacking system in accordance with the invention showing picking up a second bale in a series of three.
Figure 7:
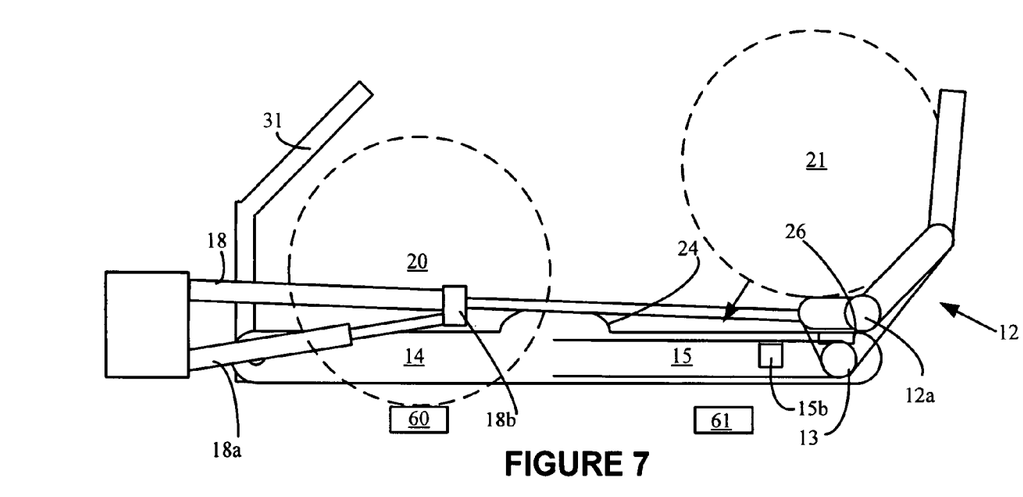
FIGS. 7 and 8 are schematic end views of the hay bale stacking system in accordance with the invention showing the unloading of the second bale.
Figure 8:
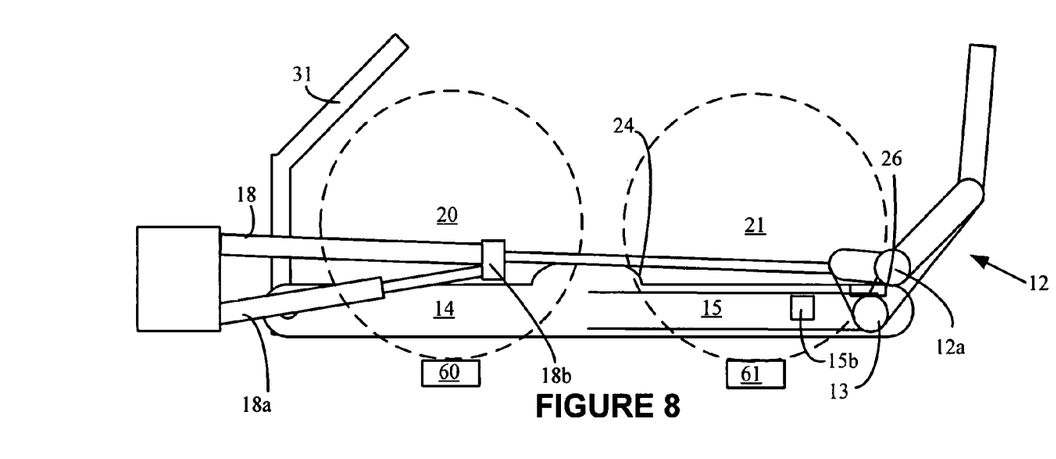

The second hay bale 21 is collected and lifted from the field in the manner described above. As shown in FIGS. 6 and 7, with one-way stop 26 engaged, as the hydraulic cylinder is activated, inward movement of the track pivot wheel 13 is prevented whilst still enabling upward and inward movement of the cradle pivot wheel 12a. As a result, movement of the main hydraulic cylinder causes the cradle to rotate (FIG. 7) and the second hay bale to roll onto the trailer (FIG. 8). The second hay bale will then depress a second treadle 61 which causes latch 15b to disengage.

The cradle is then returned to the loading position as described above.

Loading the Third Bale

A third bale 22 is then loaded within the cradle 12 as described above for the first two bales.

Figure 9:
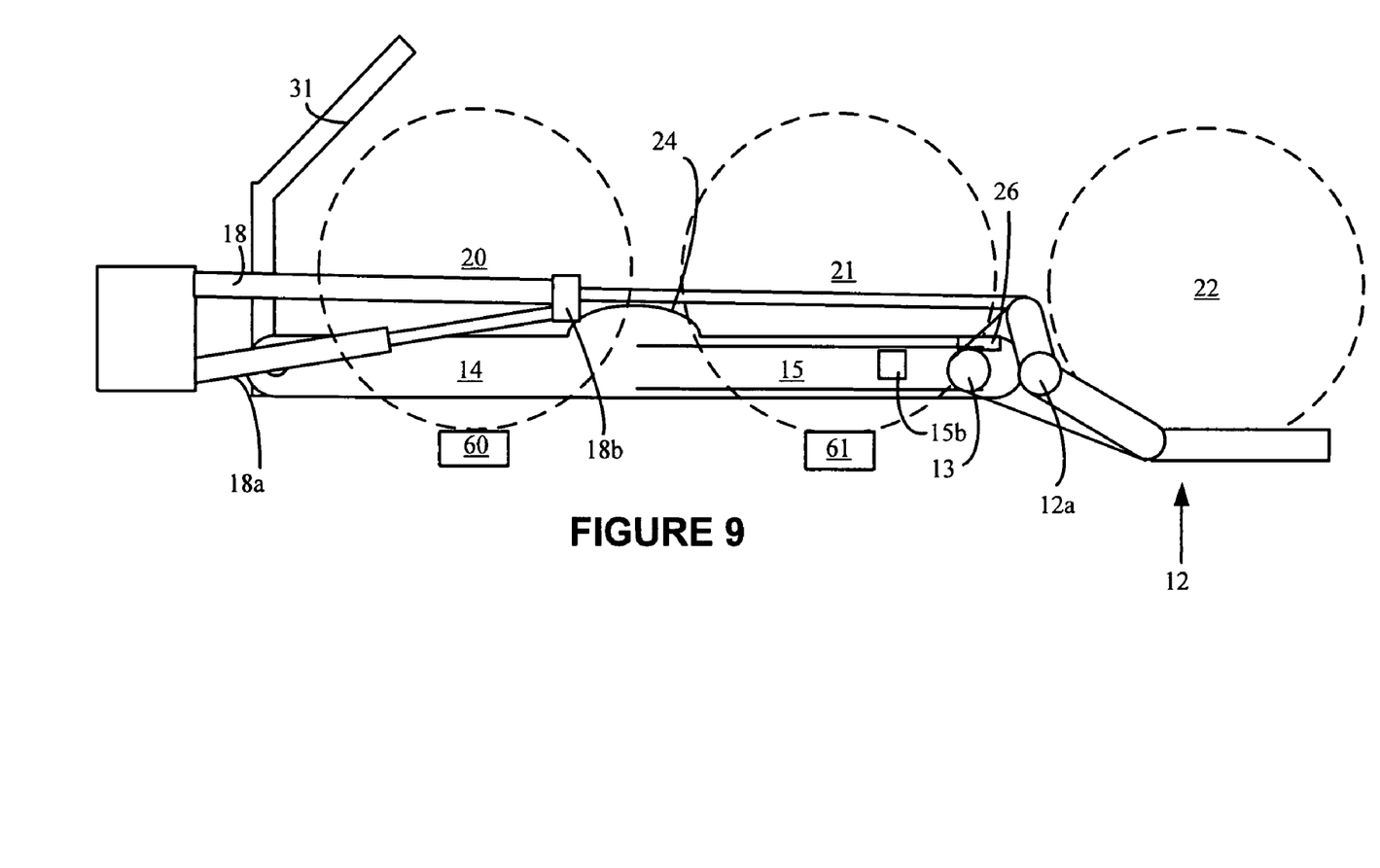
FIG. 9 is a schematic end view of the hay bale stacking system in accordance with the invention showing picking up a third bale in a series of three.
Figure 10:
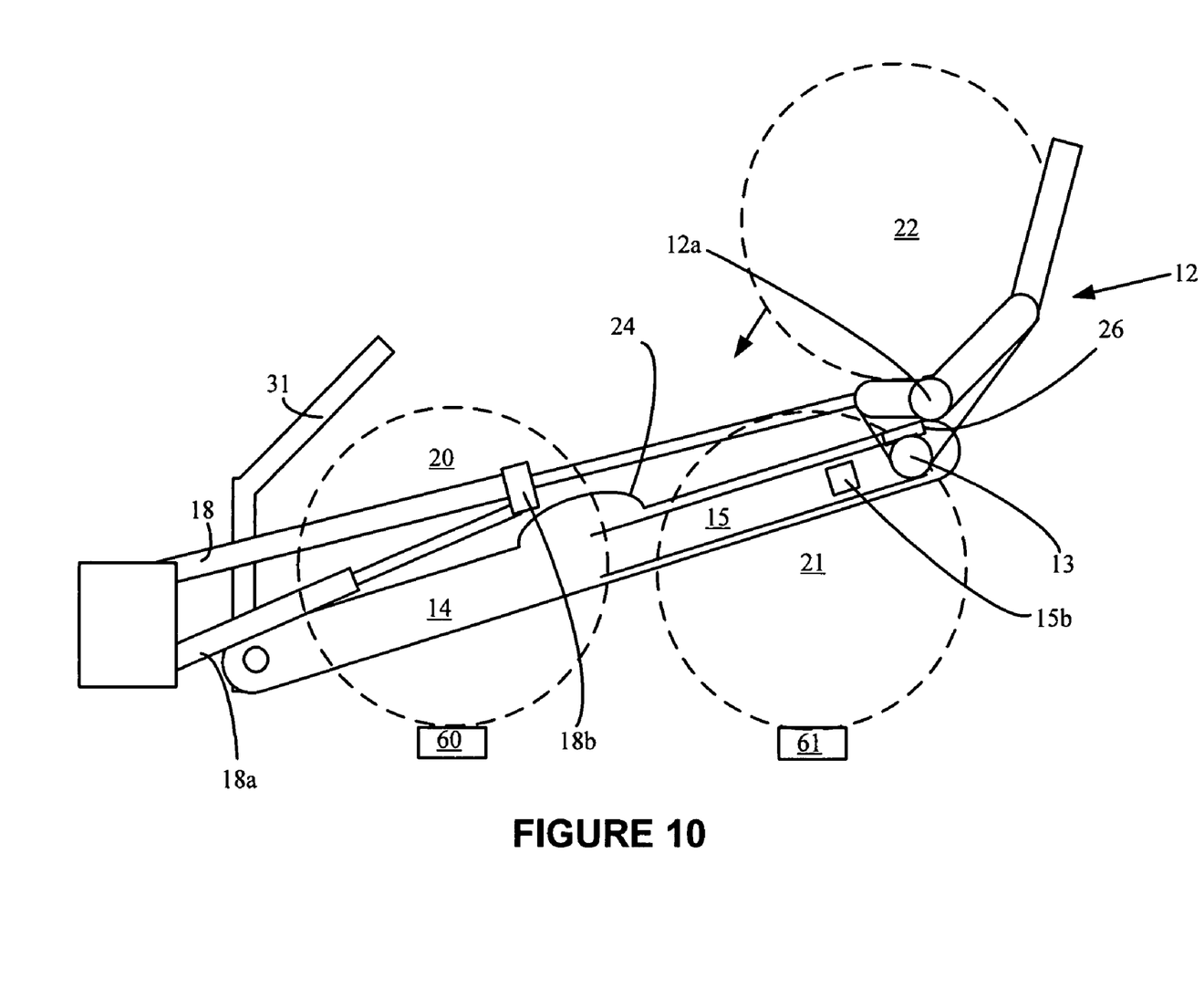
FIGS. 10 and 11 are schematic end views of the hay bale stacking system in accordance with the invention showing the unloading of the third bale.
Figure 11:
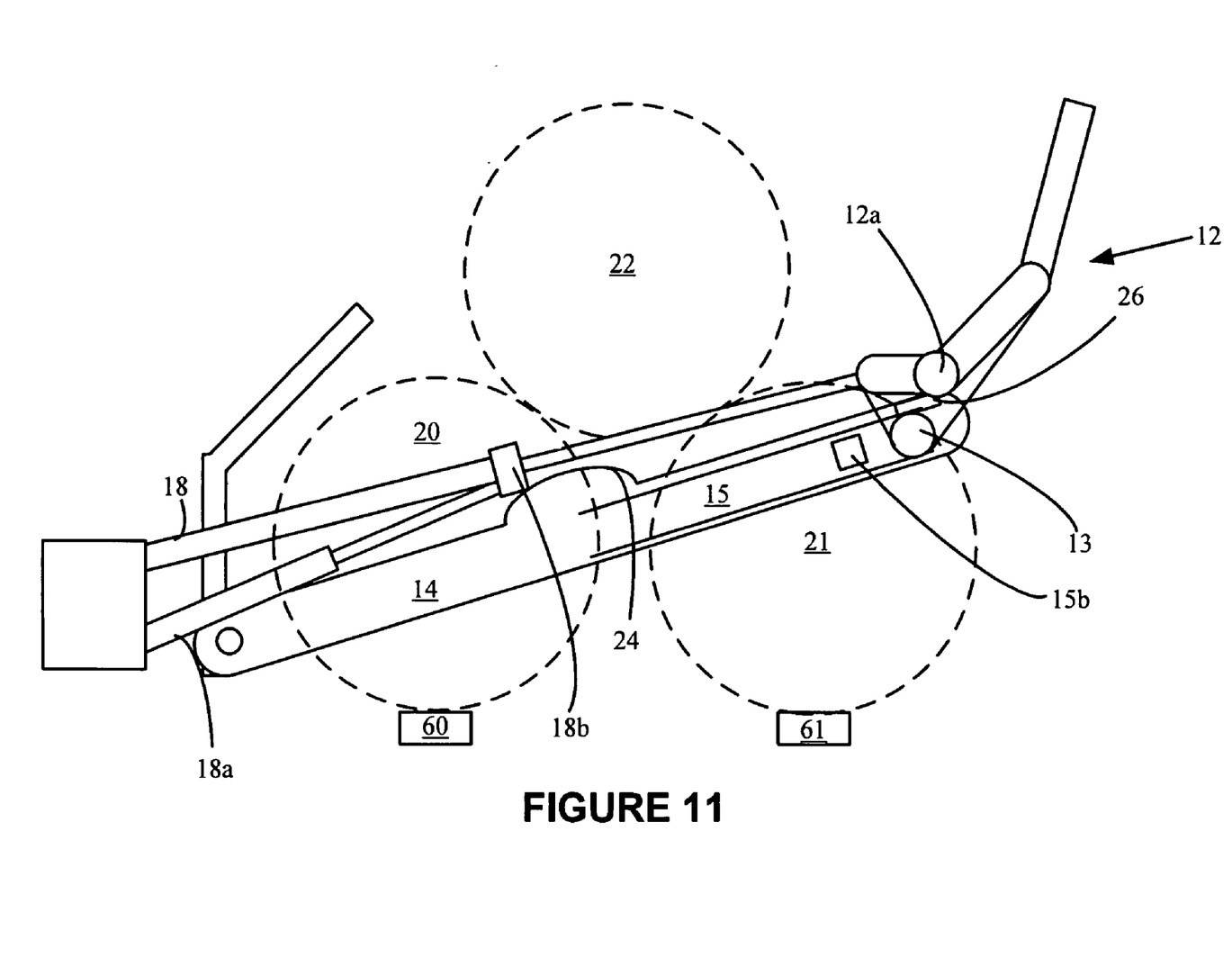

As shown in FIGS. 9-11, with latch 15b having been released and one-way stop still engaged, activation of the main hydraulic cylinder will cause the cradle to rotate upwardly as described above for the second bale 21. Continued actuation of main hydraulic cylinder and actuation of auxiliary hydraulic cylinder 18a will then cause the main pivot arm 14 to rotate upwardly about pivot 14a until the third hay bale 22 rolls from the cradle 12 onto bales 20, 21.

Loading Subsequent Tiers

In a preferred embodiment, the flat bed trailer 30 as shown in FIG. 1 is equipped with at least one conveyor belt 32. When three hay bales 20, 21, 22 have been stacked as shown in FIGS. 1 and 11, the conveyor belt(s) 32 move the set or tier of hay bales at a minimum the horizontal length of one hay bale towards the rear of the trailer 30. Sufficient space is now available to stack another three hay bales in a tiered configuration. This process may then be repeated until the flat bed trailer 30 is full.

Unloading the Flat Bed Trailer

A loaded trailer is then driven to a desired unloading location whereby the hay bales can be removed from the back-end of the trailer by continued activation of the conveyor belts 32. In one embodiment, the back end of the trailer may be lowered to minimize the drop at the end of the trailer and to thereby allow the hay bales to be unloaded smoothly without falling off the rear of the flatbed trailer 30 in order to minimize the risk of damage to the hay bale or wrapping material if any.

System Control

The system is controlled by appropriate control systems to allow the retraction and extension of the hydraulics and the activation and deactivation of the one-way stop and latch as known to those skilled in the art. In particular, each of the main and auxiliary cylinders may be configured such that a single control allows for synchronized operation of the hydraulic systems while loading all three hay bales.

For example, as shown in FIG. 12, appropriate cables 60a, 61a may be interconnected between treadles 60, 61 and one-way stop 26 and latch 15b, respectively. In addition, appropriate switches may be incorporated at appropriate locations on the system so as to prevent movement of components past the normal ranges of motion.

Although the invention has been described with reference to a particular arrangement of parts, features and the like, these are not intended to exhaust all possible arrangements or features, and indeed many other modifications and variations will be ascertainable to those of skill in the art.

The invention claimed is:

1. A hay bale stacking system for operative attachment to a trailer for lifting and stacking hay bales on the trailer, the hay bale stacking system comprising:
 a main pivot arm having a first end and a second end, the first end being pivotally connected to a first side of the trailer and said main pivot arm extending transversely across said trailer to a second side of the trailer, the main pivot arm including a main track and a guide track;
 a cradle having a track pivot wheel operably mounted within the main track and a cradle pivot wheel operatively mounted on the guide track, the cradle for operable support and lifting of a hay bale from the ground to the trailer, said cradle being rotatable with respect to said main pivot arm via at least said cradle pivot wheel and said guide track;
 a hydraulic system for moving the cradle along the main track, for rotating the cradle with respect to the main pivot arm and for lifting the main pivot arm, wherein the main pivot arm, cradle and hydraulic system are operable between a ground position and first and second positions where a first hay bale and a second hay bale are successively unloaded to a first location and a second location beside each other on the trailer and a third position where a third hay bale is unloaded on top of said first hay bale and said second hay bale in the first and second locations;
 a first stopping means on said main track for stopping inboard movement of said track pivot wheel along said main track and allowing rotation of said cradle and unloading a hay bale at said first location; and
 an actuatable second stopping means connected to said main track for preventing inboard movement of said track pivot wheel within said main track and allowing rotation of said cradle and unloading a hay bale to said second location, wherein the main pivot arm includes a latch for locking the main pivot arm in a lower position when unloading a hay bale to the first and second positions.

2. A hay bale stacking system as in claim 1, wherein the latch is operable to an unlocked position enabling the main pivot arm to upwardly pivot for unloading a hay bale to the third position.

3. A hay bale stacking system as in claim 1, wherein the hydraulic system includes a main hydraulic cylinder and piston and an auxiliary hydraulic cylinder and piston for supporting the main hydraulic cylinder and piston.

4. A hay bale stacking system as in claim 1, wherein the cradle includes a cradle extension system for adjusting the size of the cradle.

5. A hay bale stacking system as in claim 1, further comprising a first treadle operatively connected to the trailer, the first treadle including an operative connection between the first treadle and said actuatable second stopping means wherein actuation of the first treadle activates the actuatable second stopping means.

6. A hay bale stacking system as in claim 1, further comprising a second treadle operatively connected to the trailer, the second treadle including an operative connection between the second treadle and the latch wherein actuation of the second treadle disengages the latch.

7. A hay bale stacking system as in claim 1, further comprising a conveyor belt system for operative connection to the trailer for moving tiers of hay bales rearwardly on the trailer.

8. A hay bale stacking system as in claim 1, wherein the second stopping means is a one-way stop for preventing inboard movement of the track pivot wheel within the main track when unloading a hay bale from the second position.

9. A hay bale stacking system as in claim 8, wherein the latch is operable to an unlocked position enabling the main pivot arm to upwardly pivot for unloading a hay bale from the third position.

10. A hay bale stacking system as in claim 9, wherein the hydraulic system includes a main hydraulic cylinder and piston and an auxiliary hydraulic cylinder and piston for supporting the main hydraulic cylinder and piston.

11. A hay bale stacking system as in claim 10, wherein the cradle includes a cradle extension system for adjusting the size of the cradle.

12. A hay bale stacking system as in claim 11, further comprising a first treadle operatively connected to the trailer, the first treadle including an operative connection between the first treadle and one-way stop wherein actuation of the first treadle activates the one-way stop.

13. A hay bale stacking system as in claim 12, further comprising a second treadle operatively connected to the trailer, the second treadle including an operative connection between the second treadle and latch wherein actuation of the second treadle disengages the latch.

14. A hay bale stacking system as in claim 13, further comprising a conveyor belt system for operative connection to the trailer for moving tiers of hay bales rearwardly on the trailer.

15. A hay bale stacking system for operative attachment to a trailer for lifting and stacking hay bales on the trailer, the hay bale stacking system comprising:
   a main pivot arm having one end pivotally connected to a first side of the trailer, said main pivot arm extending in a transverse direction across the trailer with respect to a longitudinal axis of the trailer, said main pivot arm comprising a main track and a guide track;
   a cradle comprising a track pivot wheel and a cradle pivot wheel, said track pivot wheel being operably mounted within the main track, said cradle pivot wheel being operatively mounted on said guide track, the cradle for operable support and lifting of a hay bale from the ground to the trailer;
   a hydraulic means for moving said cradle between a ground position, a first position, a second position and a third position;
   a first stop;
   an actuatable second stop, said cradle receiving a first hay bale in said ground position, said cradle with the first hay bale moving from said ground position to said first position via said hydraulic means with said actuatable second stop in a non-actuated state, said track pivot wheel moving along said main track with said actuatable second stop in said non-actuated state via said hydraulic means, wherein said cradle with the first hay bale engages said first stop such that said cradle at least partially rotates with respect to said main pivot arm to release the first hay bale at a first hay bale location on the trailer, said cradle moving from said first position to said ground position via said hydraulic means such that said actuatable second stop switches from said non-actuated state to an actuated state, said cradle receiving a second hay bale in said ground position with said actuatable second stop in said actuated state, said track pivot wheel being in a fixed position with said actuatable second stop in said actuated state, said cradle pivot wheel being movable with said actuatable second stop in said actuated state such that said cradle with the second hay bale rotates with respect to said main pivot arm to release said second hay bale at a second hay bale position on the trailer, the second hay bale position being adjacent to the first hay bale position, said cradle moving from said second position to said ground position with said actuatable second stop in said actuated state, said cradle receiving a third hay bale in said ground position with said actuatable second stop in said actuated state, said cradle with the third hay bale moving from said ground position to said third position via said hydraulic means such that the third hay bale is released to a third hay bale position on the trailer, the third hay bale position being located above the first hay bale position and the second hay bale position; and
   a latch, said latch being in a locked state with said actuatable second stop in said non-actuated state, said latch being in a released state when said cradle releases the second bale in the second bale position, wherein said main pivot arm is pivotable with respect to the trailer with said latch in said released state, said guide track being opposite said main track.

16. A hay bale stacking system in accordance with claim 15, further comprising a first treadle operatively connected to the trailer, the first treadle including an operative connection between the first treadle and one-way stop wherein actuation of the first treadle activates the one-way stop.

17. A hay bale stacking system in accordance with claim 16, further comprising a conveyor belt system for operative connection to the trailer for moving tiers of hay bales rearwardly on the trailer.

18. A hay bale stacking system for operative attachment to a trailer for lifting and stacking hay bales on the trailer, the hay bale stacking system comprising:
   a main pivot arm having a first end and a second end, the first end being pivotally connected to a first side of the trailer and said main pivot arm extending transversely across said trailer to a second side of the trailer, the main pivot arm including a main track and a guide track;
   a cradle having a track pivot wheel operably mounted within the main track and a cradle pivot wheel operatively mounted on the guide track, the cradle for operable support and lifting of a hay bale from the ground to the trailer, said cradle being rotatable with respect to said main pivot arm via at least said cradle pivot wheel and said guide track;
   a hydraulic system for moving the cradle along the main track, for rotating the cradle with respect to the main pivot arm and for lifting the main pivot arm, wherein the main pivot arm, cradle and hydraulic system are operable between a ground position and first and second positions where a first hay bale and a second hay bale are successively unloaded to a first location and a second location beside each other on the trailer and a third position where a third hay bale is unloaded on top of said first hay bale and said second hay bale in the first and second locations;
a first stopping means on said main track for stopping inboard movement of said track pivot wheel along said main track and allowing rotation of said cradle and unloading a hay bale at said first location;
an actuatable second stopping means connected to said main track for preventing inboard movement of said track pivot wheel within said main track and allowing rotation of said cradle and unloading a hay bale to said second location; and
a first treadle operatively connected to the trailer, the first treadle including an operative connection between the first treadle and said actuatable second stopping means wherein actuation of the first treadle activates the actuatable second stopping means.

* * * * *